March 20, 1928.
J. LEDWINKA
1,663,516
DOOR FOR AUTOMOBILE BODIES
Filed Aug. 17, 1925
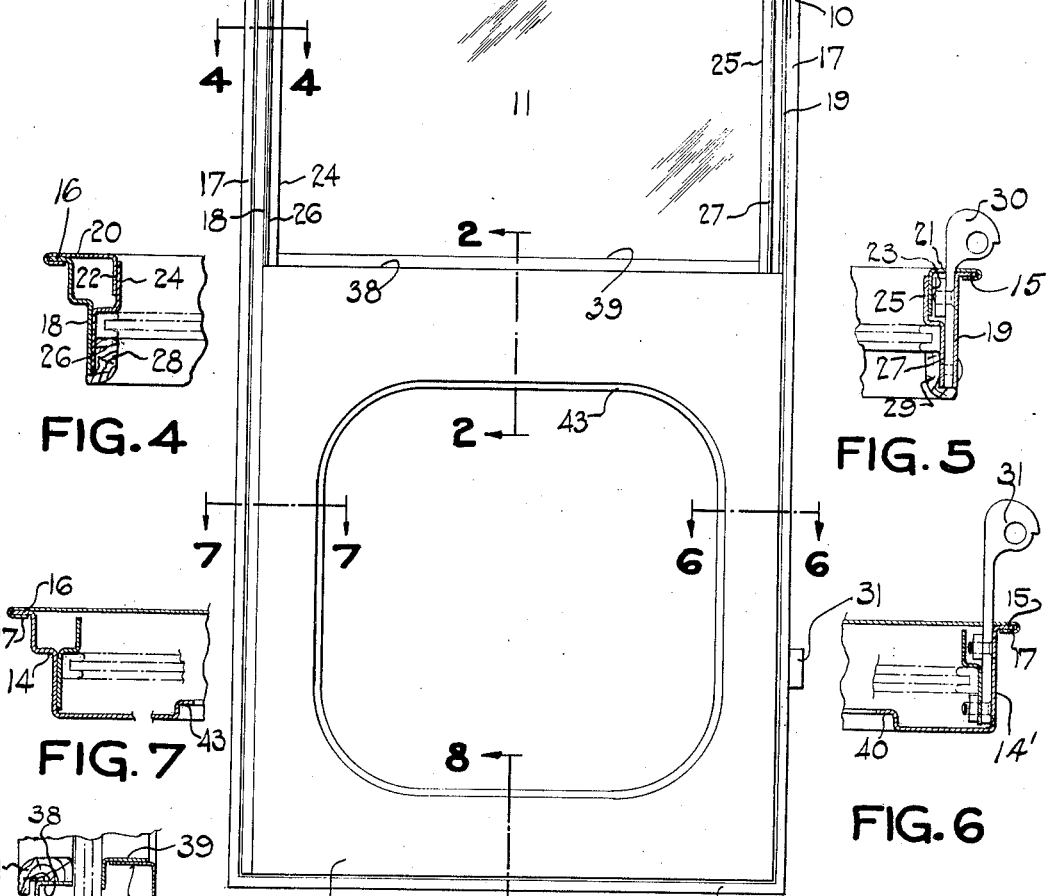
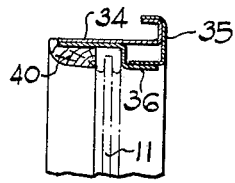
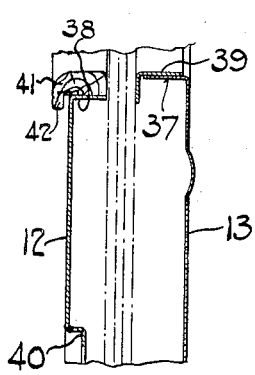
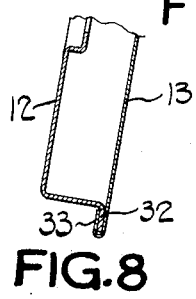
INVENTOR.
JOSEPH LEDWINKA
BY
ATTORNEY.

Patented Mar. 20, 1928.

1,663,516

UNITED STATES PATENT OFFICE.

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

DOOR FOR AUTOMOBILE BODIES.

Application filed August 17, 1925. Serial No. 50,599.

This invention relates to doors for automobile bodies.

The object of the invention is to provide an improved door structure for automobile bodies, and particularly a door structure for bodies of the closed type, to secure strength and rigidity, while at the same time reducing the weight of the door.

A further object is to provide a door for automobile bodies wherein a window or glass pane slides vertically in guides formed in the sides of the door frame so as to be raised to cover the upper open part of the door frame, or lowered into a closed pocket in the lower part of the door frame, and wherein a minimum of width of the sides of the door frame is employed so as to increase to a maximum the range of vision from the interior of the body.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the drawings,

Fig. 1 is a view in elevation of the inner side or face of a door constructed in accordance with my invention.

Figs. 2, 3, 4, 5, 6, 7 and 8 are broken detail views in section on the lines 2—2, 3—3, 4—4, 5—5, 6—6, 7—7, 8—8, respectively, of Fig. 1.

In automobile bodies and particularly bodies of the closed type, it is a common practice to employ doors the upper part of which is left open to be occupied by a sliding glass pane when the body is to be closed, which pane is lowered into a pocket in the lower part of the door when it is desired to leave the body open for ventilation or otherwise. The purpose of providing the glass pane to fill the opening in the upper part of the door when the body is closed up is to enable the occupant of the closed body to see through the pane. In employing a sliding glass pane for the purpose referred to it is necessary to construct the door frame with side members having tracks or guideways therein to receive the side edges of the sliding pane. It is also desirable that the door frame be made strong, sturdy and rigid, particularly in the upper part thereof, so as to enable the door to stand the shock of the slams and jars, and the stresses and strains to which the doors are subjected when in use. This necessity for securing strength and rigidity in the upper part of the door frame is particularly important in doors for closed bodies not only because the upper part of such frames is open, but also because these doors are of considerable size, length and weight, and, therefore, ordinarily, are less able to take and stand the stresses and strains imposed upon them. These necessities have led to the employment of side members of the door frame, particularly in the upper parts thereof, of considerable width and bulk. This, however, is objectionable for the reason that, by reason of their size, width and bulk, they very materially reduce the range of free vision of occupants of the car, whether or not the glass panes are in their raised position. It is among the special purposes of my present invention to provide a door structure for closed automobile bodies which is not only light in weight, but is also strong, rigid and sturdy while at the same time the range of vision of persons occupying the closed body is not materially interfered with by the side members of the door frame.

In carrying out my invention I propose to employ side door frame structures which are of minimum width but which at the same time are of such formation as to secure the desired degree of strength and rigidity.

In the drawings I have shown a door for a closed automobile body wherein the upper part 10 of the door frame is left open to receive a sliding window pane 11, when raised, out of a pocket formed in the lower part of the door by the inner and outer panels 12, 13. The door frame consists of outer main side rails 14, 14' at the side edges of the door, which are respectively metal stampings of generally double angle shape and of simple angle shape in cross section and extend the full length of the door. The inner panel 12 for the lower part of the door may, if desired, be stamped out integrally with the lower parts of the side rails 14, 14' and hence this panel constitutes a cross connection for the door frame side rails at opposite sides of the door. This inner panel at the hinge edge of the door is formed into a channel and terminates in a lateral edge flange 15 (see Fig. 6), which lies in the same vertical plane with a lateral edge flange 16, which forms the terminal edge for the opposite side of said panel (see Fig. 7). The outer panel 13 is flanged at its vertical side edges, over the flanges 15, 16, as indicated at 17 in Figs. 6 and 7, and by reason of the formation of the edges of the inner panel, or of the door frame side rail members 14, 14' the two panels 12, 13 are offset from each other to form a pocket between them into which the window pane is lowered, when not required for use in its raised position. The side rails 14, 14', or the side edge portions of the inner panel 12 are formed with vertical extensions 18, 19 (see Figs. 4 and 5), which, respectively, constitute portions of the upper part of the door frame at opposite side edges of the door. Likewise the outer panel 13 is formed with vertically-extending portions 20, 21, at the side edges thereof. (See Figs. 4 and 5.) These portions 20, 21 are flanged over the edge flanges 15, 16 of the vertically extending portions of the inner panel 12. At their inner vertical edges, the outer panel extensions 20, 21, are formed with flanges 22, 23, which are engaged by edge flanges 24, 25 of reinforcing strips 26, 27, which are secured to the extensions 18, 19 of the inner panel 12 thus constituting the side door rail structures at opposite sides of the window opening of a box section not substantially exceeding in width, as measured in the plane of the door, the depth of the glass run channel. These reinforcing strips 26, 27, which are substantially of simple Z section, are provided with moulding strips 28, 29, which form with reinforcing strips, guides or glass run channels for the edges of the glass panel 11. Any suitable means, as for instance offset projections, may be used to secure the reinforcing strip 27 in spaced relation to the extension 19, this space, as is best shown in Figs. 5 and 6, being provided for the accommodation of the upper and lower door hinges 30, 31.

At its lower edge, the outer panel is flanged over a bottom edge flange 32 of the inner panel 12, as shown at 33 in Fig. 8.

The extreme upper ends of the side rail structures of the door frame are connected by a tie rail 34 (see Fig. 3) which is a stamping formed into channel shape at its outer edge. Over this channel is engaged a channel shaped outer rail stamping 35 to which is connected a Z-shaped stamping 36 which forms a top stop for the glass pane when in its raised position.

At its upper edge the outer panel 13 is formed with a lateral flange 37 and the corresponding edge of the inner panel 12 is provided with an oppositely presenting flange 38 (see Fig. 2). A top rail 39 in the form of an angle shaped stamping is applied to the flange 37, the spacing relation of the flanges 37, 38 being such as to provide for the movement of the glass panel between them when raised and lowered, the angle stamping 39 forming a guide for said pane. Molding strips 40 and 41 are removably secured to the rail 34 and lateral flange 38, respectively, to supplement the side strips 28 and 29. The molding strip 41 is preferably provided with an overhanging portion 42 which is spaced from the panel 12 a distance sufficient to accommodate the upper end of the trim.

If desired and in order to reduce the weight of the door, the inner panel 12 may be cut out centrally as indicated at 43, the inner surface of this panel being ordinarily covered over by a trim or upholstery.

A door structure such as above described avoids the objections and secures the advantages and benefits above described. It is not only light in weight, but is strong, rigid and sturdy and capable of withstanding the stresses, strains, shocks and jars of usage; and of still greater importance, the side frame structure for the upper open part of the door is very narrow and hence does not materially interfere with the range of vision of occupants of the car.

Having set forth the objects of my invention and a structure embodying the principles thereof, I wish it to be understood that many changes in the specific details of the structures might readily occur to persons skilled in the art and still fall in the scope and spirit of my invention.

What I claim is—

1. A door rail for closed body vehicles comprising a lower section formed integrally with the inner panel of the door, and having a laterally-extending flange thereon constituting the lower outer over-lap of the door, and an upper section of substantially angle section integrally joined to said lower section, said upper section having a laterally-extending flange in vertical alignment with said first mentioned laterally-extending flange to form therewith the outer over-lap of the door.

2. In a door rail for closed body vehicles, a double angle member having one portion thereof constituting the outer over-lap of the door and another portion thereof constituting the edge of the door, a Z member having a portion thereof joined to said second mentioned portion and a main web at right angles thereto, and a moulding strip secured to said Z member whereby to form a glass run channel between the web of said Z member and the inner edge of said molding strip.

3. In a door for closed body vehicles, an outer panel, an inner panel, vertically-extending angles at the sides of the inner panel and formed integral therewith to constitute the lower section of the door rails, said angles projecting a substantial distance above the upper ends of said panels to form the upper section of the door rails, Z-shaped members having each an arm secured directly to a branch of the upper section of each door rail, and panel strips each having a portion secured to the other arms of said Z members and flanged over the other branches of said angle members, said panel strips being joined to the said outer panel at the lower ends thereof.

4. In a door for closed body vehicles, an inner panel having inturned edges to form the jamb faces of the door, and an angular member secured directly to the inner surface of each of said inturned edges to form the base and one wall of a glass run channel, one of said angular members being spaced from its corresponding inturned edge to permit the insertion therebetween of a door hinge member.

5. In a door for closed body vehicles, a member having a main body portion constituting the jamb face of the door and a laterally extending flange constituting the overlap of the door, an outer panel having one portion bent over said laterally extending flange and a second portion extending inwardly of the door and parallel to said jamb face of the door, and an angle member of simple Z form having one branch thereof rigidly secured to said inwardly extending portion of said outer panel and the other branch thereof directly secured to but spaced from said jamb face of the door a distance sufficient only for the accommodation of a hinge member.

6. In a door for closed body vehicles, a member having a main body portion constituting the jamb face of the door and a laterally extending flange constituting the overlap of the door, an outer panel having one portion bent over said laterally extending flange and a second portion extending inwardly of the door and parallel to said jamb face of the door, and an angle member of simple Z form having one branch thereof rigidly secured to said inwardly extending portion of said outer panel and the other branch thereof spaced from said jamb face of the door a distance sufficient only for the accommodation of a hinge member, said last mentioned branch constituting the base of a glass run channel.

7. A hinge rail for doors of closed vehicle bodies comprising a main transversely extending body portion of web cross section, and an angular member secured to the inner surface of said transversely extending body portion but spaced apart therefrom at the hinge location sufficient only to permit the insertion therebetween of a hinge member, said angular member being adapted to receive the edge of the window glass.

8. In a door for closed vehicle bodies, a hinge rail structure having a main transversely extending body portion of web cross section, a hinge strap disposed on the inside of said transversely extending body portion, and a glass run having its base wall disposed substantially in the vertical transverse plane of the inner face of said hinge strap, all of said parts being rigidly secured together.

9. A door rail for doors of closed vehicle bodies comprising a main transversely extending body portion of web cross section arranged in the jamb plane of the door, and an angular member secured to the inner surface of said transversely extending web portion and forming a side wall of a glass run, and being extended and connected to the outer edge of said main transversely extending body portion, and a moulding strip connected to said transverse web portion and forming the other side wall of the glass run.

In testimony whereof I hereunto affix my signature.

JOSEPH LEDWINKA.